L. J. MOST.
MAGAZINE PENCIL.
APPLICATION FILED JULY 27, 1921.
Reissued Jan. 3, 1922. 15,260.
Fig. 1,
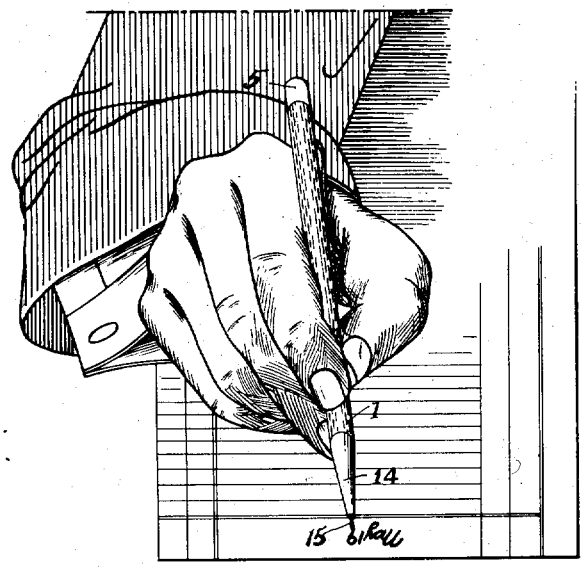
Fig. 2,
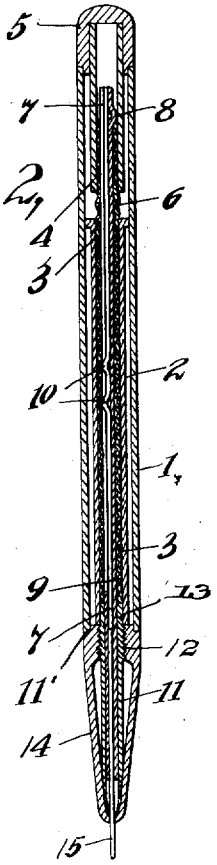
Fig. 5,
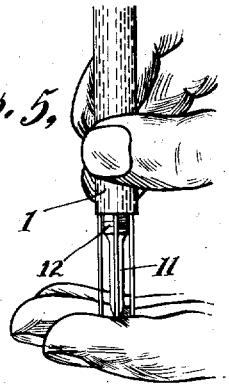
Fig. 3,
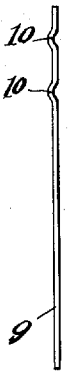
Fig. 4,
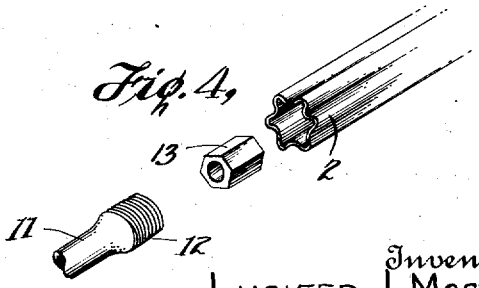
Inventor
LUCIFER J. MOST,
By his Attorney
Arthur Nicolson

UNITED STATES PATENT OFFICE.

LUCIFER J. MOST, OF NEW YORK, N. Y., ASSIGNOR, BY MESNE ASSIGNMENTS, TO PENCIL PRODUCTS CORPORATION, A CORPORATION OF VIRGINIA.

MAGAZINE PENCIL.

15,260. Specification of Reissued Letters Patent. Reissued Jan. 3, 1922.

Original No. 1,325,570, dated December 23, 1919, Serial No. 303,281, filed June 11, 1919. Application for reissue filed July 27, 1921. Serial No. 488,006.

*To all whom it may concern:*

Be it known that I, LUCIFER J. MOST, a citizen of the United States, residing at New York, in the county and State of New York, have invented certain new and useful Improvements in Magazine Pencils; and I do hereby declare the following to be a full, clear, and exact description of the invention, such as will enable others skilled in the art to which it appertains to make and use the same.

This invention relates to improvements in magazine pencils and has particular reference to the general type of pencil embodied in my copending application, filed August 22, 1918, Serial No. 251,457.

The objects of the invention are to provide a pencil as described which will embody in its construction, a simple means whereby perfect alinement or register of the parts is assured when they are secured together after filling and refilling; and to provide means whereby the supply leads may be thrust simultaneously from the magazine to a point sufficiently removed from the writing end of the casing to permit the leads to be easily grasped and inserted in proper relation to the lead-projecting mechanism.

These objects are accomplished in the device disclosed in the accompanying drawings, in which similar reference numerals designate similar parts and in which—

Figure 1 is a view showing the pencil in use.

Figure 2 is a longitudinal section slightly enlarged, through the pencil;

Figure 3 is a detail view of a part which will hereinafter be termed the feeder;

Figure 4 is an enlarged perspective view of some of the parts disassembled, and

Figure 5 is a fragmentary elevation of the lower extremity of the pencil illustrating the manner of projecting the leads.

Referring in detail, to the parts, 1 designates an outer casing. 2 is a corrugated magazine barrel which is secured concentrically within the casing and embraces a helically grooved tube or feed operating member 3. The member 3 is secured to a tube 4 forming a part of a cap 5 held upon one end of the casing 1, in such manner as to be capable of rotation thereon. A guide and lead-containing cylinder 6 is held within the tube 3 which tube extends approximately the length of the shell and is provided with a longitudinal slot 7 and a lug 8 acting to retain the cylinder 6 in its proper position.

Within the lead-containing cylinder is a feeder or propelling bar 9 having a uniform thickness throughout its length and formed with a pair of offsets 10 which function in alternate grooves of the tube 3 and engage through and along the slot 7 in the lead-containing cylinder.

An inner nozzle 11, tapered at its outer extremity and formed with a threaded portion 12 at its inner proximal end, engages over and is attached to the outer end of the lead-containing cylinder. This inner nozzle has soldered thereto a multi-sided extension 13, which virtually constitutes the distal end of the nozzle, and each side of which snugly engages the corresponding innermost wall of each corrugation of the barrel with the angle between any two adjacent sides of the extension disposed intermediate the outermost wall of each corrugation. Provision is thus made for connecting the nozzle 11 with the barrel in an extremely rigid manner, and having established such rigidity, a perfect fit between the inner terminal of outer nozzle 14 and the adjacent terminal of casing 1, as at 11′. Outer nozzle 14, tapered at one end and internally threaded at the other, engages the threaded portion of the inner nozzle and acts as a closing member for the magazine section.

The magazine is defined by the inner wall of the shell and the outer walls of the corrugations of the barrel. In each corrugation, a lead 15 is held in reserve, while the active lead is maintained axially of the cylinder 6 and the nozzle 11. As the lead is consumed, the point is fed outwardly by turning the cap 5 and the operating member 3, the grooves of which, upon engaging the offsets 10, will constrain the feeder outwardly and thus force the lead out of the holder. It is obvious that an opposite turning movement of the cap will draw the feeder inwardly.

As explained at length in my copending application, when it is desired to insert a new lead, the outer nozzle 14 is removed and the end of the inner nozzle is tapped against the hand or other object. In this position, as exhibited in Fig. 5, all of the leads in the magazine will partially gravitate from the magazine simultaneously, being projected outwardly substantially coextensive with the end of the inner nozzle 11. Then upon slightly elevating the writing end of the pencil, any one of the leads may be withdrawn and inserted in the inner nozzle. The outer nozzle is replaced and the user proceeds to adjust the new lead for writing. The important point to bear in mind is that no matter how fragile the leads may be, they are preserved intact because the end of the nozzle receives and absorbs the impact, the nozzle strikes the object first, and the leads follow. Furthermore, the screw threaded base 12 of the nozzle serves as an extended bearing for the leads; that is, a bearing in addition to the one afforded by the magazine. This is important too, for when the leads have been projected as illustrated in Fig. 5, and the tips of the fingers are placed in a position to grasp one of the leads, the space is so limited that a slight flexing of the two adjacent leads is bound to ensue, and were it not for the presence of this extended bearing, the leads would be broken quite frequently.

Having thus described this invention, I claim:

1. A pencil having the combination of a casing, mechanism therein for projecting the lead, a longitudinally recessed lead supply barrel, open at the writing end, a nozzle having a screw-threaded proximal end and a multisided distal end, and a closure for the open end of the barrel engageable with said threaded end of the nozzle, said multisided end of the nozzle being rigidly secured within said barrel.

2. A pencil having a casing provided with an annular reservoir adapted to hold leads, a nozzle extending from said casing having a portion thereof smaller than the interior periphery of said reservoir, means on said nozzle forming a continuation of the interior wall of said reservoir whereby leads when slid from the reservoir will be thereby spaced from the small portion of the nozzle to facilitate their being grasped by the fingers, and a closure member for said reservoir.

3. The device of claim 2 in which the means comprise an enlarged shank portion provided on the nozzle.

4. The device of claim 2 in which the means also coact with the closure member to keep the latter in place.

5. The device of claim 2 in which the closure member and means are threaded and coact with each other to keep the closure member in place.

6. A pencil having a casing provided with an annular reservoir adapted to hold leads, a nozzle extending from said casing having a portion thereof smaller than the interior periphery of said reservoir, whereby leads when slid from the reservoir will be thereby spaced from the small portion of the nozzle to facilitate their being grasped by the fingers, and a closure member for said reservoir.

7. A pencil having a casing provided with an annular reservoir adapted to hold leads, a member closing the end of the reservoir and removable to allow the withdrawal of the leads, and an element projecting into the closing member being of such diameter relative to the position of the leads when protruding from the reservoir as to leave the leads spaced so as to permit them to be grasped by the fingers and readily removed.

8. A pencil having a casing, an annular reservoir adapted to hold leads, a nozzle extending from said casing smaller than the interior periphery of said reservoir whereby leads when slid from the reservoir will be spaced to facilitate their being grasped by the fingers and a closure member for said reservoir.

9. A pencil having a casing provided with an annular reservoir adapted to hold leads and opening at the writing end of the pencil, a member closing the end of the reservoir and removable to allow the withdrawal of the leads, and an element projecting into the closing member serving as a guide to indicate the extent of protrusion of the leads and leaving them spaced so as to permit them to be grasped by the fingers and readily removed.

10. In a pencil having a casing, an element extending beyond the casing at the writing end thereof, a closure for the casing forming the writing cap of the pencil, and means for securing the closure to the projecting element.

11. In a pencil having a casing, the element projecting therefrom, a closure for the casing forming the writing cap of the pencil, and means within the casing for engaging the projecting element to secure the closure to the projecting element.

12. A pencil comprising a casing, open at the writing end, and adapted to hold a plurality of leads in spaced relation, a nozzle disposed adjacent to the open end of said chamber and extending beyond it, and a closure for the open end of the chamber, said leads being simultaneously projectable from the chamber to a point co-extensive with the outer end of said nozzle as the nozzle is thrust against a suitable support, and means whereby said leads when so projected, maintain their original spaced relationship and are further spaced with respect to said nozzle.

13. A pencil comprising a casing, open at the writing end, adapted to hold a plurality of leads in spaced relation, a nozzle disposed adjacent to the open end of said chamber and extending beyond it, and a closure for the open end of the chamber said leads being simultaneously projectable from the chamber to a point co-extensive with the outer end of said nozzle as the nozzle is thrust against a suitable support, said leads when so projected being equidistantly spaced relatively to each other and are further spaced with respect to said nozzle.

14. A pencil comprising a casing, open at the writing end, and adapted to hold a plurality of leads in spaced relation, a nozzle disposed adjacent to the open end of said chamber and extending beyond it, said leads being projectable from the chamber to a point co-extensive with the outer end of said nozzle as the nozzle is thrust against a suitable support, said leads when so projected being equidistantly spaced relatively to each other and being further spaced with respect to said nozzle and a closure for the open end of said chamber.

15. A pencil comprising a casing, open at the writing end, and adapted to hold a plurality of leads in spaced relation, a nozzle having a reduced extremity disposed adjacent to the open end of said chamber and extending beyond it, said leads being projectable from the chamber to a point substantially co-extensive with the outer end of said nozzle as the nozzle is thrust against a suitable support, said leads when so projected maintaining their original equidistant spacing relatively to one another and being further spaced with respect to the reduced extremity of said nozzle and a closure for the open end of said chamber.

16. A pencil comprising a casing, open at the writing end, and adapted to hold a plurality of leads in spaced relation, a nozzle disposed adjacent to the open end of said chamber and extending beyond it, and being further provided with an extremity which has a diameter less than the smaller diameter of said chamber, said leads being projectable from the chamber to a point substantially co-extensive with the outer end of said nozzle as the nozzle is thrust against a suitable support, and a closure for the open end of said chamber.

17. In a pencil, in combination, a casing, lead propelling mechanism, a compartmented magazine surrounding said mechanism, leads in said magazine adapted to be slid therefrom, nozzle means for spacing the user's finger a proper distance from the magazine whereby the leads are stopped as they slide from the magazine and are prevented from falling entirely out of the magazine, and a closure for the casing.

18. The device of claim 17 in which the magazine is annular and the spacing means comprise a nozzle smaller than the inner periphery of the magazine.

19. In a pencil, in combination, a casing, lead propelling mechanism, a magazine surrounding said mechanism, leads in said magazine adapted to be slid longitudinally therefrom, a cap for the writing end of the pencil casing, and co-acting means carried by said cap and within the casing for closing said magazine.

20. In a pencil, in combination, a casing, lead propelling mechanism, a magazine, leads in said magazine adapted to be slid longitudinally therefrom, a cap for the writing end of the pencil casing adapted to close said magazine, and threaded means adapted to enter said casing and carried by said cap for securing it in writing position and closing said magazine.

21. In combination in a pencil, a casing, a lead propelling mechanism therein including a tube, a magazine for reserve leads between the casing and said propelling mechanism, and means normally fixed in relation to the casing and the magazine encircled by said magazine and abutting one end of said tube to act as a stop to any displacement of said tube in a direction toward said means.

LUCIFER J. MOST.